Patented Sept. 6, 1949

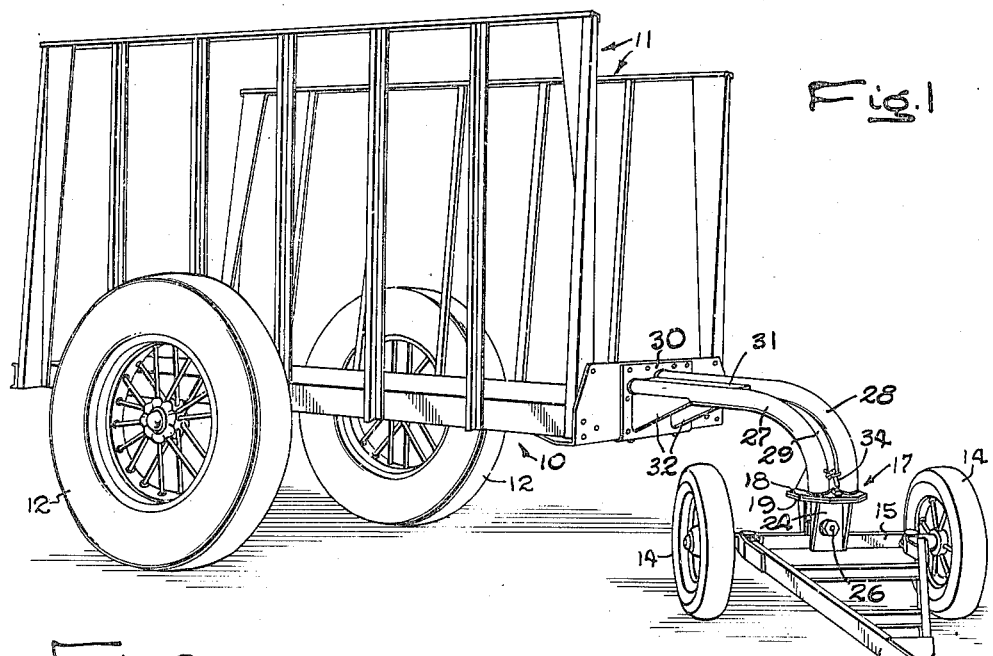
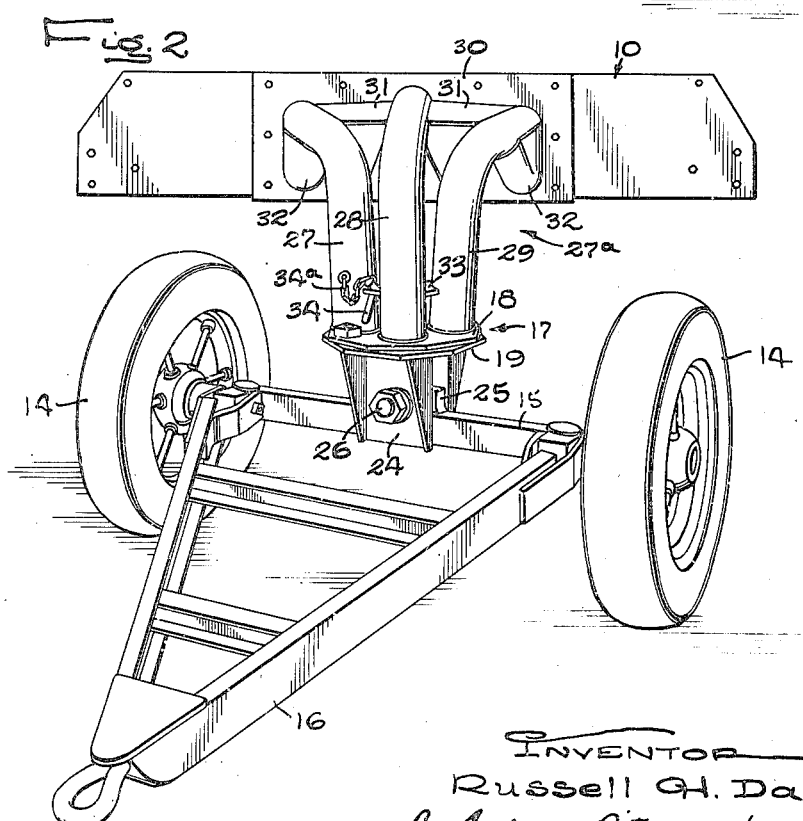

2,481,005

UNITED STATES PATENT OFFICE 2,481,005

GOOSENECK TRAILER

Russell H. Danhaus, Quincy, Ill., assignor to Electric Wheel Company, Quincy, Ill., a corporation of Illinois Application June 19, 1947, Serial No. 755,747

4 Claims. (Cl. 280—113)

The present invention pertains to wheeled vehicles and more particularly to a novel gooseneck type of trailer or cart.

The general object of the invention is to provide a four wheel trailer or cart having an extremely rugged and durable gooseneck connection from the main body frame to a fifth wheel on the front axle of the vehicle and so arranged as to afford complete freedom of turning for the front axle.

Further objects and advantages of the invention will become apparent as the following description proceeds, taken in connection with the accompanying drawings, in which:

Figure 1 is a general perspective view of a cane cart embodying the present invention.

Fig. 2 shows the front end portion of the cart of Fig. 1 on a somewhat enlarged scale.

Figure 3:
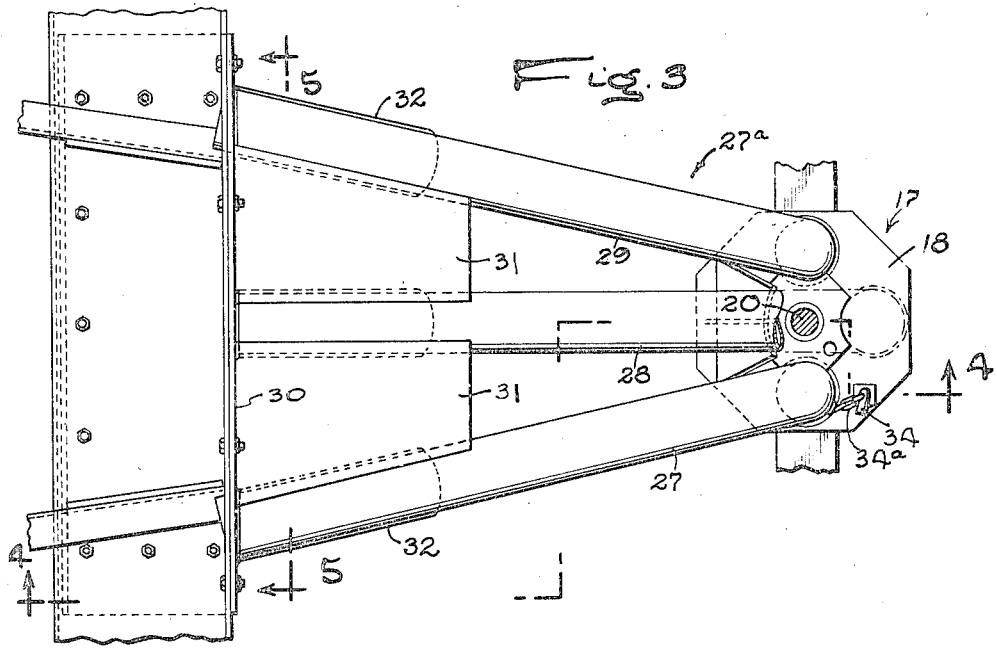
Fig. 3 is a plan view, also on an enlarged scale, of the gooseneck assembly at the front end of the cart shown in Fig. 1.

Although one particular embodiment of the invention has been shown and described in some detail herein, there is no intention to thereby limit the invention herein secured to that particularly embodiment. On the other hand, the intention is to cover all modifications and alternative constructions falling within the spirit and scope of the invention as expressed in the appended claims.

Referring more particularly to the exemplary embodiment of the invention which has been illustrated, the vehicle shown in the drawings is designed as a cart for hauling cane from the fields where it is grown. For such duty it must be capable of carrying extremely heavy loads over rough terrain and with a high degree of maneuverability.

In the instant construction the cart comprises a body or main frame 10 (Fig. 1) of rectangular form with upstanding retaining frames 11 along its side edges. A pair of large diameter rear ground wheels 12 support the rear portion of the cart. At the front, a small pair of ground wheels 14 are journaled on a front axle 15. A tongue 16 extends forwardly from the front axle for attachment of the trailer cart to a suitable tractor or other towing vehicle (not shown).

To the center of the front axle 15 is attached a fifth wheel designated generally as 17. Such fifth wheel comprises a pair of octagonal plates 18, 19 (see Figs. 2 and 4) adapted to swivel with respect to each other, while in face-to-face engagement, about a king pin 20. Such pin is received in a sleeve 21 fixed to the upper plate 18 and in a bushing 22 within a sleeve 23 secured to the lower plate 19. Such sleeve 23 is fixed between a downwardly extending pair of spaced plates 24, having reinforcing flanges on their side edges, and welded or otherwise rigidly fixed to the plate 19.

The front axle 15 extends between the lower portions of the opposed plates 24, 24. A block 25 is fixed to the central portion of the axle and has a pivot bolt 26 extending through it, thus pivoting the axle to rock about a horizontal axis in passing over uneven ground.

Joining the main body 10 to the fifth wheel 17 is a novel gooseneck assembly designated generally as 27a (Figs. 1 and 2). This assembly includes a plurality (here shown as three) of tubular members 27, 28 and 29, which may conveniently be fashioned from some suitably heavy steel pipe stock. At their rear ends these members 27 to 29 are welded or otherwise rigidly fixed to a transverse end plate 30 bolted to the front of the main frame 10. The members 27 to 29 project forwardly from the end plate 30 in side-by-side, forwardly converging relation (Figs. 2 and 3) the axis of the horizontal portion of the member 28 being disposed above those of the members 27 and 29. The forward portions of such members are curved forwardly and downwardly in generally gooseneck configuration and their forward ends are secured at spaced points to the top plate 18 of the fifth wheel 17, being welded or otherwise suitably fixed to such plate. More particularly, the ends of the members 27 and 29 are fixed to the fifth wheel on substantially diametrically opposite sides of the pin 20, while the middle member 28 is secured to the plate 18 at a point spaced forwardly from the pin 20.

To rigidify the connection of the tubular members 27 to 29 to the end plate 30 a special arrangement of webbing and gussets is desirably employed. This includes a pair of generally horizontal reinforcing webs 31 extending between adjacent members (Figs. 2 and 5) and welded or otherwise rigidly secured to them as well as to the end plate 30. Also included in such arrangement are reinforcing gussets or brackets 32 for respective ones of the tubular members 27 to 29. These gussets are generally channel shaped being arranged in embracing relation with respect to the tubular members and welded or otherwise rigidly fixed to them. The gussets slope angularly downward from the tubular members to the end plate 30, to which they are also fixed, thereby securely bracing the tubular or goosenecked members 27 to 29. At the forward or lower ends of the latter members a transverse web 33 (Figs. 3 and 4) is welded to them and to the sleeve 21, thereby joining the members and holding such sleeve in place.

The gooseneck assembly 26 as described above can readily be fabricated without resort to special castings or the like. On the other hand, it affords an extremely strong construction especially adapted to withstand the violent and erratic changes in loading that are frequently imposed during use.

The goosenecked members 27 to 29 are elevated well above the front wheels 14 (Figs. 1 and 2) so that the front axle 15 can be turned through any desired angle, the front wheels passing freely beneath the gooseneck. A high degree of maneuverability is thus afforded for the vehicle, an especially valuable attribute in snaking the cart out of a cane field or along a rough forest trail.

Figure 4:
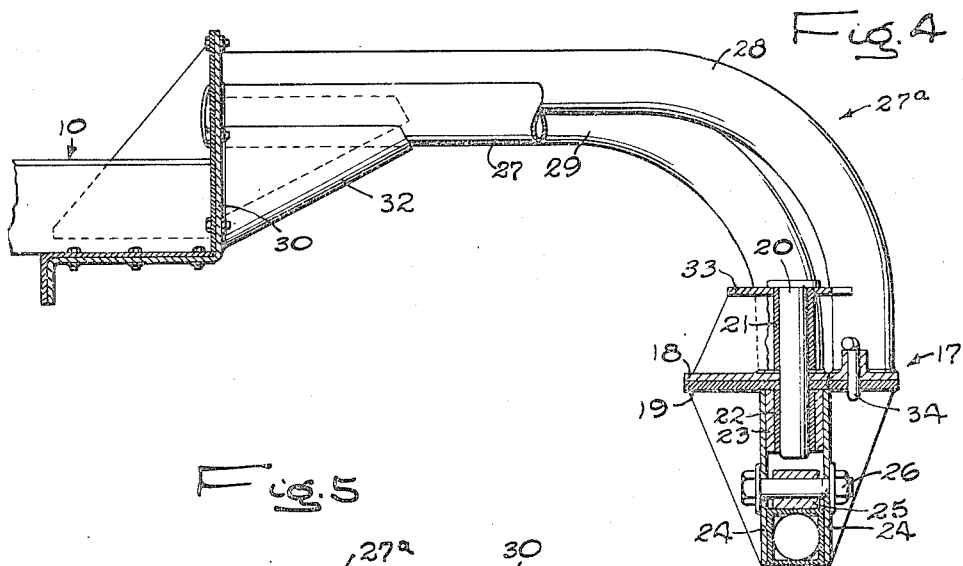
Fig. 4 is a side elevation of the gooseneck assembly, partially in section along the line 4—4 of Fig. 3.
Figure 5:
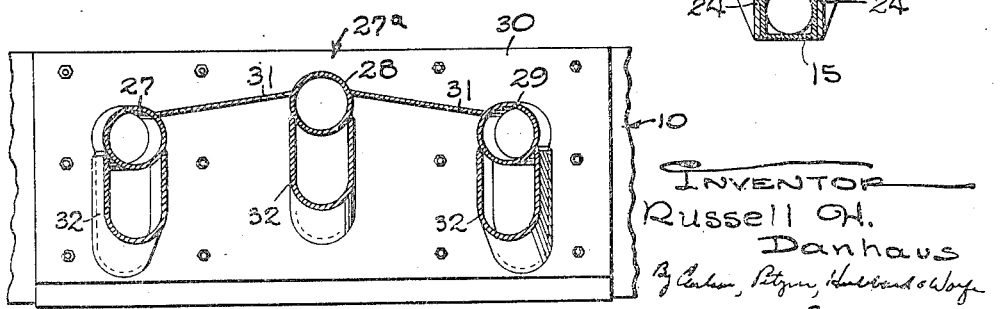
Fig. 5 is a transverse sectional view taken substantially along the line 5—5 of Fig. 3.

In some instances it may be desirable to lock the fifth wheel 17 against turning, as for example, in going down a steep slope on a rough road. For such purpose a locking pin 34 is provided, being held against loss by safety chain 34a. To lock the fifth wheel against turning this pin is dropped into registering holes in the plates 18, 19 as shown in Fig. 4.

I claim as my invention:

1. In a vehicle of the type set forth, the combination of a body having an end plate extending transversely across its front end, a plurality of tubular members rigid with said plate and projecting forwardly from said plate in generally side-by-side relation, transverse webs joining said members adjacent said plate, generally channel shaped gussets embracing the lower sides of respective ones of said members and sloping diagonally downward therefrom to a lower portion of said plate to which they are rigidly secured as well as to the respective members for bracing the latter, the forward portions of said members being curved downward in generally gooseneck form, a front axle having ground wheels thereon, and a fifth wheel for swiveling said axle on the forward ends of said members for free turning of the axle with the ground wheels thereon passing beneath said goosenecked members.

2. In a vehicle of the general type described, the combination of a body having a pair of rear wheels, a front axle having a pair of front wheels thereon and having a fifth wheel at its center, said fifth wheel being pivotally secured to the axle to permit rocking movement of the axle with respect to said body about a horizontal axis, and a plurality of tubular members projecting forwardly side-by-side from said body at a level above said front wheels and converging forwardly in downwardly curved gooseneck form to said fifth wheel with their forward ends connected to such fifth wheel at spaced points thereon.

3. In a vehicle of the general type described, the combination of a body having a pair of rear wheels, a front axle having a pair of front wheels thereon and a fifth wheel at its center, three tubular members secured to said body in laterally spaced relation and projecting horizontally forward therefrom at a level above said front wheels and converging forwardly in downwardly curved gooseneck form to said fifth wheel, the horizontal portion of the central tubular member being disposed above the corresponding portions of the outer two members, the forward ends of the outer two members being secured to said fifth wheel at points located on substantially diametrically opposite sides of its central axis of turning, and the forward end of the central tubular member being secured to said fifth wheel at a point spaced forwardly of the central axis of turning thereof.

4. In a vehicle of the type set forth, the combination of a body having an end plate extending transversely across its front end, a plurality of tubular member rigid with said plate and projecting forwardly from said plate in generally side-by-side relation, generally channel shaped gussets embracing respective ones of said members and sloping therefrom to portions of said plate to which they are rigidly secured as well as to the respective members for bracing the latter, the forward portions of said members being curved downward in generally gooseneck form, a front axle having ground wheels thereon, and a fifth wheel for swiveling said axle on the forward ends of said members for free turning of the axle with the ground wheels thereon passing beneath said goosenecked members.

RUSSELL H. DANHAUS.

REFERENCES CITED

The following references are of record in the file of this patent:

UNITED STATES PATENTS

| Number | Name | Date |
| --- | --- | --- |
| 80,489 | Janvrin | July 28, 1868 |
| 1,739,463 | Jarvis | Dec. 10, 1929 |